Jan. 2, 1968  D. L. FULLER  3,361,512
WIDE ANGLE OBJECTIVE HAVING NON-SPHERICAL SURFACES
Filed April 5, 1966  3 Sheets-Sheet 1

INVENTOR.
David L. Fuller

BY: Newton, Hopkins,
Jones & Ormsby

ATTORNEYS

Jan. 2, 1968            D. L. FULLER            3,361,512

WIDE ANGLE OBJECTIVE HAVING NON-SPHERICAL SURFACES

Filed April 5, 1966            3 Sheets-Sheet 2

INVENTOR.

David L. Fuller

BY: Newton, Hopkins,
Jones & Ormsby

ATTORNEYS

Jan. 2, 1968  D. L. FULLER  3,361,512
WIDE ANGLE OBJECTIVE HAVING NON-SPHERICAL SURFACES
Filed April 5, 1966  3 Sheets-Sheet 3

INVENTOR
David L. Fuller

United States Patent Office 3,361,512
Patented Jan. 2, 1968

---

3,361,512
WIDE ANGLE OBJECTIVE HAVING NON-SPHERICAL SURFACES
David L. Fuller, 3535 Roswell Road NW., Apt. E4, Atlanta, Ga. 30305
Filed Apr. 5, 1966, Ser. No. 540,246
5 Claims. (Cl. 350—190)

The invention herein relates to photographic objective lenses and is concerned with a concentric optical system which has its surfaces formed as non-spherical surfaces, said objective forming a cylindrical panoramic image, and is an improvement of my copending application Ser. No. 142,913, filed Oct. 4, 1961, for a wide angle objective having non-spherical surfaces, now U.S. Patent No. 3,251,266.

Two principal methods are presently used to produce panoramic pictures on cylindrical film. The first is the mono-concentric lens system which is used in conjunction with a field flattening lens, and the second is the scanning lens system.

The first method although achieving a large horizontal, angular coverage is inhibited by a restricted vertical coverage and a general loss of image quality due to astigmatism at the top and bottom edges of the film, as well as defraction around the front aperture controlling plates.

The second method is inherently complicated and mechanically cumbersome and cannot be used to make an instantaneous exposure because different portions of the film are exposed at later time intervals.

It is an object of the present invention to provide a lens system capable of producing a wide congruent panoramic image of at least 120° horizontally and vertical coverage of not less than 45° on cylindrical film.

A further object of the invention is to provide two apertures incorporated therein, said apertures so arranged to permit an equal aperture area for each and every principal ray entering the system, thereby resulting in even brightness of the image from corner to corner.

Still another object is to provide a stationary optical system whereby a between the lens shutter can be adapted to it, thereby permitting instantaneous exposure of the cylindrical film used in conjunction therewith.

An additional object is to provide a simple, compact, well corrected design which can be easily mass produced in molded plastics or other transparent materials.

In its most general aspect, the invention herein disclosed derives its uniqueness from the configuration of the individual lens surfaces. The system is not designed according to the well known techniques for axi-symmetric optical systems, rather it is created from a more fundamental aspect, that of devising two dissimilar sets of an equal number of surfaces independently in two orthogonal meridians, and in the final step combining these two sets into one optical system.

The result is an optical system composed entirely of non-spherical surfaces and so arranged that the effective focal length for any meridian cut through the system is essentially the same as that for any other meridian, even though the power added to a fan of rays at a given surface may not be equal for the two meridians.

A further general aspect of the invention is the characteristic of concentricity. All of the surfaces in the system have at least one meridian thereon which lies in the plane of the largest field angle and which is concentric about a common axis of revolution. Therefore, the system is free from all asymmetric aberrations in this meridian. In addition, all focal points generated in the image space conform closely to a cylinder about the common axis of revolution which has a radius equal to the effective focal length of the system. In the meridian orthogonal to the first, which is in the direction of the smaller field angle, the system is non-concentric and of completely different character than the first, thus the concept of two dissimilar sets is seen. The reason for creating this dissimilarity is two-fold, namely; to provide independent means for treating the sagittal and tangential astigmatic surfaces in the system, and also to make it necessary to include two apertures in the system, one for each set, thereby giving good image quality and precise control of image brightness. These concepts and others will be described in greater detail further on.

These and other features and advantages of the present invention will become more clearly understood upon consideration of the following specification and the accompanying drawings wherein like characters of reference designate corresponding parts throughout and in which.

Figure 1:
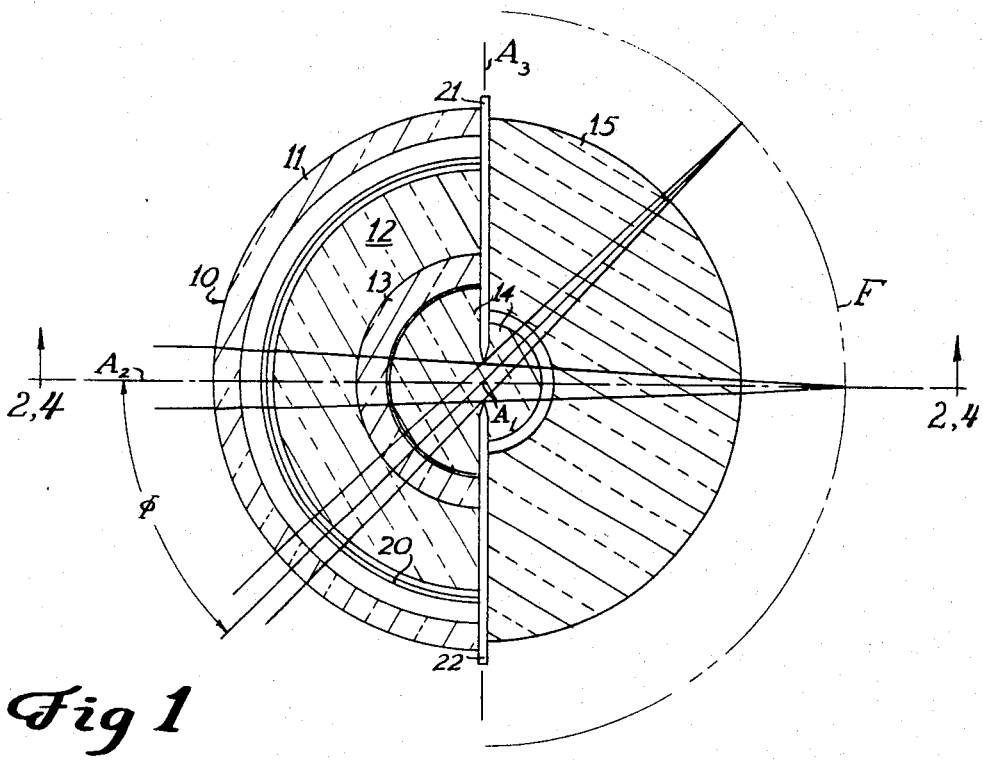
FIG. 1 is a horizontal meridian view of the lens system in the direction of the larger field angle, including the aperture arrangement constructed in accordance with the invention.
Figure 2:
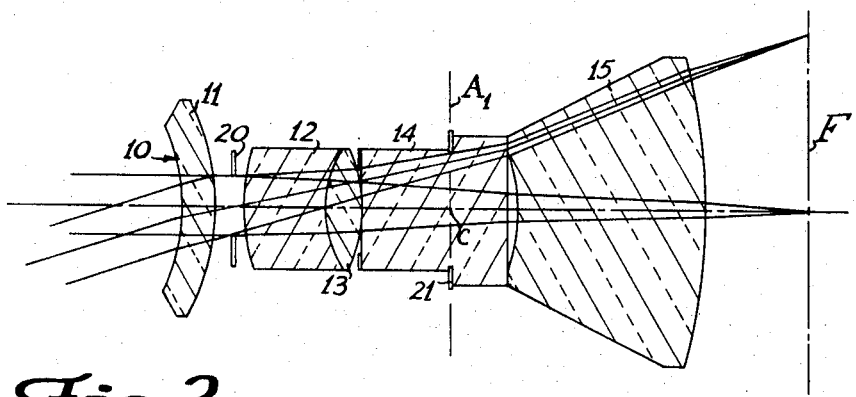
FIG. 2 is a vertical meridian view in the direction of the smaller field angle taken along the line 2—2 in FIG. 1.

Referring now in detail to the drawings chosen for the purpose of illustrating the present invention, it being understood that in its broader aspects, the present invention is not limited to the exact details herein depicted, the lens system, as viewed in FIG. 1 and FIG. 2 is generally denoted by the numeral 10, and comprises a series of non-spherical surfaces each aligned along the major optical axis $A_2$, and mutually concentric in the plane $A_2$–$A_3$ about the common axis of revolution $A_1$.

Outer lens 11 is bound by a first surface which has negative curvature in FIG. 2 (the vertical meridian) and positive curvature in FIG. 1 (the horizontal meridian), and a rear surface of similar character. An air separation is provided between lenses 11 and 12 to allow for the positioning of shutter blades and a secondary aperture 20 therebetween. Intermediate lens 12 is bound forwardly by positive curvature in both the horizontal and vertical meridians, and rearwardly by a similar surface, said lens 12 forming the first lens of a cemented doublet, whereby the lens 13 completes the set having its first surface essentially in contact with the rear surface of lens 12 and cemented or otherwise mounted in place so as to form a single component. The rear surface of lens 13 has negative curvature in the vertical meridian and positive curvature in the horizontal and is forwardly spaced from the lens 14 by a small amount to prevent axial contact, whilst the inner lens 14 is bound by two cylinders, the front surface having a larger radius than the rear thereof.

The rear element, lens 15 is defined by a front surface which is negative in both the vertical and horizontal meridians, said surface being spaced rearwardly from the rear surface of lens 14, and a rear suface also with negative vertical and horizontal curvature, thus completing the objective.

A better understanding of this lens system will be manifested by reference to the following Table I which establishes values for a single embodiment of a lens system using the inventive concepts thus far described. Column I refers to the surface number beginning with the object surface (the long conjugate side of the objective), thence numbering through the system including the primary and secondary apertures, which will be described in detail later, and terminating at the image surface (the short conjugate side of the objective). Column II denotes the axial separation following the surface and columns III and IV give the surface radii in the direction of the larger and smaller field angles respectively, it being understood that all vertical centers of curvature are located in the plane of FIG. 1, with signs according to conventional optical notation. Columns V and VI give the index of refraction at the $d$-line of the spectrum and Abbé number for the media used following the surface.

TABLE I
[$f=100$; relative aperture 1/4.5; field 120° x 45°]

| I. Surface No. | II Axial Separation | III Radius in Horizontal Meridian | IV Radius in Vertical Meridian | V Index | VI Abbé No. |
| --- | --- | --- | --- | --- | --- |
| 00 | Object surface infinity | | | Air | |
| 01 | 8.119 | 78.952 | −57.157 | 1.491 | 58.0 |
| 02 | 8.119 | 70.834 | −76.296 | Air | |
| 03 | 1.353 | 62.716 | Secondary aperture | | |
| 04 | 20.356 | 61.363 | 73.001 | 1.589 | 31.0 |
| 05 | 10.013 | 37.007 | 30.853 | 1.491 | 58.0 |
| 06 | 0.420 | 26.994 | −51.684 | Air | |
| 07 | 26.575 | 26.575 | Infinity | 1.491 | 58.0 |
| 08 | 16.724 | Zero | Primary aperture | | |
| 09 | 2.490 | −16.724 | Infinity | Air | |
| 10 | 55.477 | −19.214 | −74.964 | 1.589 | 31.0 |
| 11 | 25.277 | −74.690 | −111.578 | Air | |
| 12 | Image surface | | | | |

As best seen in FIG. 1, in the manufacture of lens 10, a pair of vertical slits are cut therein from opposite sides along transverse centerline $A_3$ toward the axis of revolution $A_1$ so as to terminate within a short distance thereof. Opaque sheets 21 and 22 are received within these slits to form a vertical or primary aperture in the lens 10 through which selected rays of light may pass. It will be understood that the pre-determined aperture defined by sheets 21 and 22 may be varied as found necessary. The location of this primary aperture in the horizontal meridian at the center of concentricity eliminates all asymmetric aberrations in this meridian, thus simplifying the problem of correction.

A second aperture is now established between lenses 11 and 12. This secondary aperture is formed as an arcuate horizontally disposed slot in an arcuate sheet 20 inserted between the lenses 11 and 12 as shown in FIG. 1, and concentric about the axis of revolution $A_1$. Its location is likewise chosen to minimize the aberrations in this meridian and is most suitably positioned in an air gap.

It will be noted in FIG. 1, that the width of a sample horizontal fan of rays from an object point passing through the primary aperture varies proportionately with the cosine of the angle $\phi$ that the fan makes with the major optical axis $A_2$. To compensate for this effect, the secondary aperture is gradually widened by an amount necessary to maintain a pre-determined aperture area perpendicular to any principal ray in the system as the angle $\phi$ varies.

Figure 3:
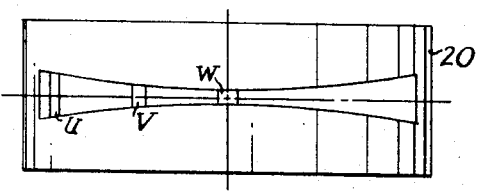
FIG. 3 shows a perspective view of the form of the secondary aperture utilized in the present invention; and, FIG. 4 is a partially enlarged view of the vertical meridian of the lens system shown in FIG. 2 showing the details of light refraction through the system.

It will be understood that in the preferred arrangement this aperture area will be maintained a constant. As seen in FIG. 3, aperture 20 is "flattened" out with three projections of the primary aperture being made on this aperture. In each case the projected areas $u$, $v$ and $w$ are equal.

Figure 5:
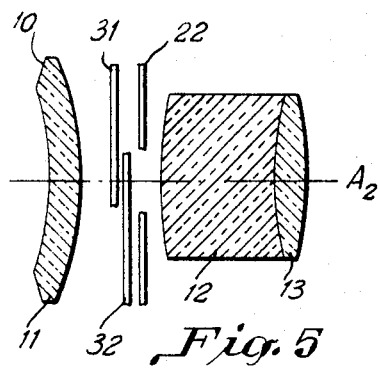
FIG. 5 is a cross-sectional view of the front portion of the lens system shown in FIG. 2 and including a shutter.
Figure 6:
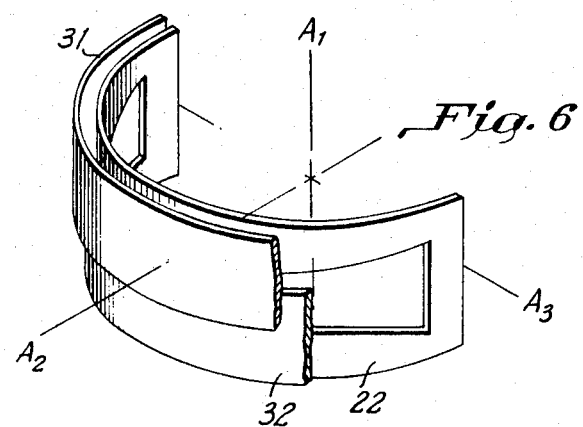
FIG. 6 is a perspective view of the shutter and aperture system shown in FIG. 5.

Referring to FIGS. 5 and 6 there is shown in detail one type of shutter which may be used with the present lens system as well as the one disclosed in the previously-mentioned U.S. Patent No. 3,251,266. This shutter includes a pair of overlapping, arcuate, thin metal plates 31 and 32 arranged in front of aperture 20. One or both of these thin, metal sheets may be moved away from the other in a well known fashion so as to permit light to pass through the aperture 20.

Figure 7:
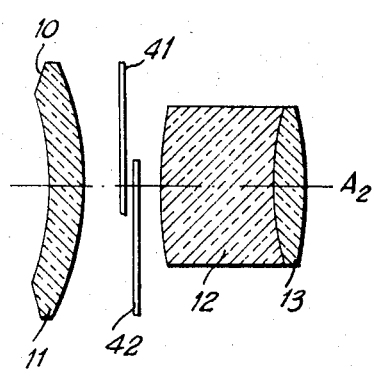
FIG. 7 is a cross-sectional view of the front portion of the lens system shown in FIG. 2 wherein the shutter and aperture comprise a single unit.
Figure 8:
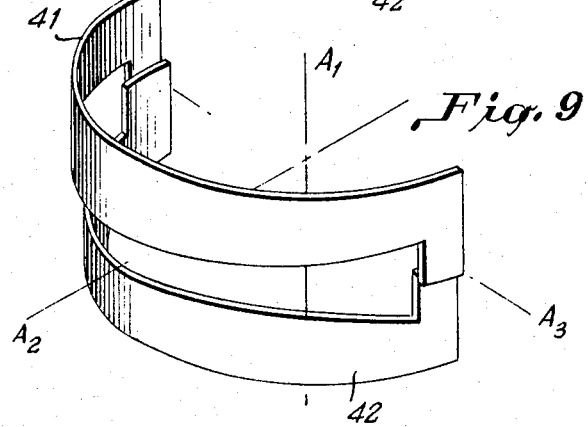
FIG. 8 is a perspective view of the combined shutter-aperture unit shown in FIG. 7 wherein the shutter aperture is closed.
Figure 9:
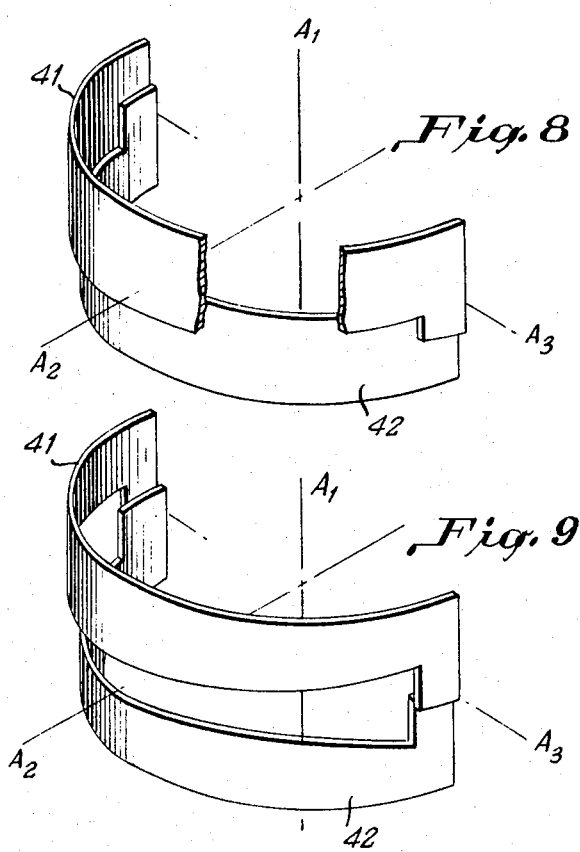
FIG. 9 is another perspective view of the combined shutter-aperture unit shown in FIG. 7 wherein the shutter aperture is open.

It may be found desirable, however, to construct a shutter in combination with the secondary aperture when this lens system is mounted in a camera as shown in FIGS. 7–9. In such an arrangement, arcuate shutter blades 41 and 42 would replace the stationary aperture 20, and be made to reciprocate in a well known fashion from and to a closed position centered on the plane of the larger field angle as shown in FIG. 8, $A_2$–$A_3$, whereby the edges of said blades, when in the open position as shown in FIG. 9, define an arcuate slot whose end portions are substantially wider than is the center thereof. Thus, it is seen that the shutter aperture combination will provide equal brightness to all portions of the image.

The design of a non-spherical lens system, like the example herein described, is approached from the point of view of deriving "perfected designs" in each of the primary meridians, wherein fans of rays may be traced and appropriate geometry developed in each plane. The computational procedure can become quite involved due to the fact that a single non-spherical surface contributes different increments of a given aberration in the primary meridians of the system. In addition, one must give concurrent attention to satisfying the conditions for congruency of the image. Thus, I have found it desirable to use well known computer techniques to rapidly analyze the current state of correction in either meridian, whereby one can easily record and organize the solutions of two optical sets almost simultaneously.

At the present time there is no adequate means available to trace skewed rays through a non-spherical lens system, because most computer programs are limited to axi-symmetric systems. I have devised a simple method of tracing skewed rays through any non-axi-symmetric optical system using the well known principles of geometric ray tracing expanded to three dimensions.

To apply this method one first constructs an index coordinate system in three dimensions thereby resulting in a series of concentric spheres whose radii are proprotional to the indices of the media employed. Likewise, the lens system under consideration is drawn in three views and a skewed ray from the object plane drawn to intercept same. The orientation of the skewed rays is then transferred to the index coordinate system and made to pass through the center of curvature, and in the next step the normal line to the surface is drawn to intersect the intial skewed ray at the point where the ray intersects the proper index sphere. The final direction of the skewed ray from the optical surface is the line joining the center of curvature of the index coordinate system and the point where the normal line intersects its appropriate index sphere, whereby this line is then transferred back to the lens system.

In a similar manner the process is repeated at each successive surface until the final ray into the image space is constructed. This method appears to be an exact solution, limited only to the designer's ability to apply it accurately.

In designing a non-spherical concentric lens system, it is imperative that any air separations in the system be kept as small as practically possible. There are two reasons for this; first, spherical aberration in the horizontal meridian is held to a minimum which is important in view of the fact that there is no direct, practical method of reducing this aberration to zero; and secondly, the system is kept from growing large in sheer physical size, which arises from the large amounts of negative power that would otherwise be necessary in the first element in the horizontal meridian to make the image congruent. An additional benefit is that a smaller system permits a larger back focal length thereby reducing the possibility of projecting dust or scratches on the last surface onto the image surface.

The shape of the sagittal astigmatic surface in a non-spherical concentric lens system is best controlled by incorporating a cylindrical surface between the common axis of revolution and the image space, followed by a short air space and a non-spherical surface with negative curvatures in both the horizontal and vertical meridians. The radius of curvature of the cylindrical surface which forms the rear surface of lens 14 in FIG. 1, should be approximately 10% to 20% of the system effective focal length, with the following air separation of 2% to 5% of same, and the forward surface of lens 15 having a vertical radius of curvature approximately twice that of the horizontal.

Figure 4:
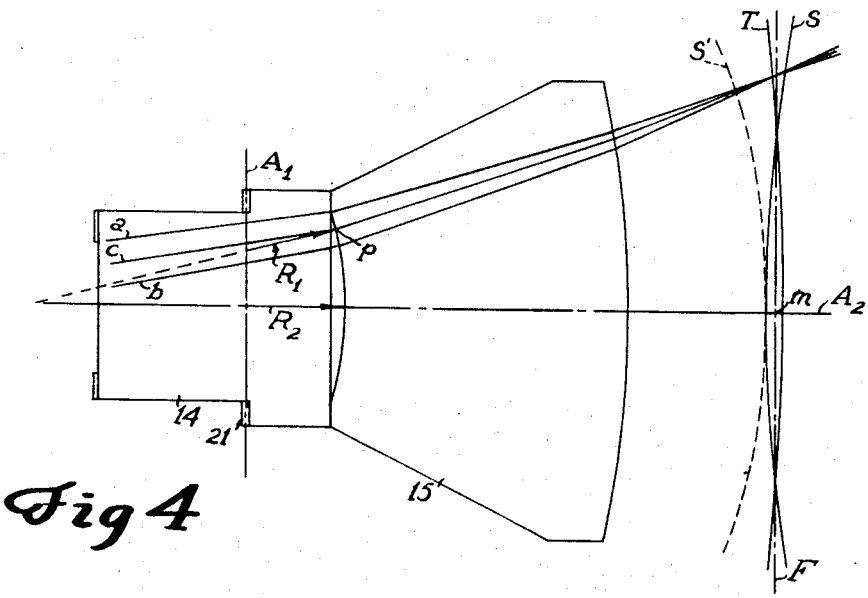

The effect of this geometry is best understood in FIG. 4, which shows lenses 14 and 15 in the vertical meridian on the optical axis $A_2$. An oblique fan of rays represented by the rays $a$, $b$ and $c$ is shown passing through these lenses having ostensibly originated at a point source on the object surface.

The method for computing the sagittal points for this lens system is derived from a surface by surface iteration of Monk's formula on principal rays in the vertical meridian. The instantaneous radius of curvature at the ray intercept point on each surface as measured in a plane containing the normal to the surface and transverse to the tangential plane must be known. This value for a non-spherical surface is found to be the distance measured along the appropriate surface normal line from the axis of revolution to the surface intercept point.

As best seen in FIG. 4, ray $c$, the chief ray of the fan, is shown to intersect the first surface of lens 15 at the point marked $p$. Point $p$ has an instantaneous radius $R_1$ in the sagittal meridian and is negative; conversely, the intercept point for an axial ray on the same surface is simply the horizantal radius, $R_2$. Thus, it is seen that $R_1$ is shorter than $R_2$, wherein there is substantially more negative power added in the case of the oblique chief ray than for the axial ray, thereby shaping the sagittal surface to the curve lettered S in FIG. 4 what would otherwise be S'.

In the final design stage the shape of the sagittal surface can be altered as necessary by making small changes in the front vertical radius of lens 15. This has been found to cause negligible effect on the aberrations in the vertical or tangential meridian.

The shape of the tangential surface T in FIG. 4, is controlled during the process of correcting in the vertical meridian. Then the tangential and sagittal surfaces are given one additional refinement; that of displacing them relative to one another parallel to the optical axis to a pre-determined separation, $m$, thereby further reducing astigmatism in the image. This is accomplished by re-positioning the axis of revolution $A_1$, thereby changing the back focal length to the sagittal surface by a small amount independently of the tangential surface.

I have found that the most economical method for producing the non-spherical lenses for the lens system herein disclosed is to injection mold them in plastic. The shape of these lenses offer ideal conditions for molding due to the fact that the lenses have a constant cross-section which permits even cooling and curing of the lenses in the mold, thus insuring a very accurate part. Under production conditions lenses can be molded at a consistent accuracy of better than four fringes, and these lenses can be made very stable if the molding process is quickly followed by hot water annealing to eliminate internal strains.

It will be obvious to those skilled in the art that many variations may be made for the purpose of illustrating the invention without departing from the scope thereof as defined by the appended claims.

I claim:

1. In an optical objective comprising a system of lenses that have at least half the optical surfaces thereof formed as non-spherical surfaces, each of said optical surfaces being aligned on a common optical axis and having an arc thereon that intersects said optical axis and is concentric about a common central axis that is perpendicular to said common optical axis, means for providing a first aperture formed centrally within said system of lenses and defining a slot extending in parallel alignment with said common central axis, and means for providing a second aperture between an adjacent pair of optical surfaces defining a slot extending substantially normal to said first aperture and being displaced from and concentric about said common central axis, said system forming an image on the short conjugate side of the objective, the improvement of two adjacent non-spherical surfaces formed on the image side of said common central axis, being spaced by an air separation, said spaced surfaces being further formed so that each spaced surface has less curvature in the plane containing the common central axis and the common optical axis than in a plane perpendicular to the common central axis and containing the common optical axis so as to increase the useful field in the plane containing the common central axis and the common optical axis.

2. An optical objective that is defined in claim 1, and further characterized in that said second aperture slot is wider at its extremities than at its center so as to permit the passage of more light at the extremities of said second aperture than at the center thereof.

3. An optical objective that is defined in claim 1 and further characterized in that said lenses are formed of molded plastic.

4. An optical objective that is defined in claim 3 and further characterized in that said lenses are formed of at least two different types of optical plastic having different refractive indices.

5. An optical objective comprising a system of lenses that have the optical surfaces thereof formed as non-spherical surfaces, each of said optical surfaces being aligned on a common optical axis and having an arc thereon that intersects said optical axis and is concentric about a common central axis that is perpendicular to said common optical axis, means for providing a first aperture defining a slot extending in parallel alignment with said common central axis, means for providing a second aperture defining a slot extending substantially normal to said first aperture and being displaced from and concentric about said common central axis, and having the following data:

[f=100; relative aperture 1/4.5; field 120° x 45°]

| I<br>Surface No. | II<br>Axial Separation | III<br>Radius in Horizontal Meridian | IV<br>Radius in Vertical Meridian | V<br>Index | VI<br>Abbé No. |
|---|---|---|---|---|---|
| 00 | Object surface infinity | | | Air | |
| 01 | 8.119 | 78.952 | −57.157 | 1.491 | 58.0 |
| 02 | 8.119 | 70.834 | −76.296 | Air | |
| 03 | 1.353 | 62.716 | Secondary aperture | | |
| 04 | 20.356 | 61.363 | 73.001 | 1.589 | 31.0 |
| 05 | 10.013 | 37.007 | 30.853 | 1.491 | 58.0 |
| 06 | 0.420 | 26.994 | −51.684 | Air | |
| 07 | 26.575 | 26.575 | Infinity | 1.491 | 58.0 |
| 08 | 16.724 | Zero | Primary aperture | | |
| 09 | 2.490 | −16.724 | Infinity | Air | |
| 10 | 55.477 | −19.214 | −74.964 | 1.589 | 31.0 |
| 11 | 25.277 | −74.690 | −111.578 | Air | |
| 12 | Image surface | | | | | wherein column I refers to the surface number beginning with the object surface, the long conjugate side of the objective, thence numbering through the system including the primary and secondary apertures and terminating at the image surface, the short conjugate side of the objective; column II denotes the axial separation following the surface; columns III and IV give the surface radii in the direction of the largest and smallest field angles respectively; and columns V and VI give the index of refraction at the d-line of the spectrum and Abbé number for the media used following the surface.

References Cited

UNITED STATES PATENTS 1,767,790  6/1930  Gerlach _____ 88—24
3,151,524  10/1964  Bouwers _____ 350—198
3,251,266  5/1966  Fuller _____ 88—57

DAVID H. RUBIN, *Primary Examiner.*

JEWELL H. PEDERSEN, *Examiner.*

R. J. STERN, *Assistant Examiner.*